US008898230B2

(12) United States Patent
O'Sullivan et al.

(10) Patent No.: US 8,898,230 B2
(45) Date of Patent: Nov. 25, 2014

(54) PREDICTING AVAILABILITY OF INSTANT MESSAGING USERS

(75) Inventors: Patrick J. O'Sullivan, Ballsbridge (IE); Al Chakra, Cary, NC (US); Sean Callanan, Churchtown (IE); Michael Muller, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 780 days.

(21) Appl. No.: 11/616,553

(22) Filed: Dec. 27, 2006

(65) Prior Publication Data

US 2008/0162632 A1    Jul. 3, 2008

(51) Int. Cl.
*H04L 29/06* (2006.01)
*H04L 12/58* (2006.01)

(52) U.S. Cl.
CPC ......... *H04L 12/5815* (2013.01); *H04L 12/5855* (2013.01); *H04L 51/04* (2013.01); *H04L 12/581* (2013.01)
USPC ...................................................... 709/204

(58) Field of Classification Search
CPC .............. H04L 12/581; H04L 12/5815; H04L 12/5855; H04L 51/04
USPC ................................................ 709/223, 204
See application file for complete search history.

(56) References Cited

U.S. PATENT DOCUMENTS

| | | | |
|---|---|---|---|
| 2003/0046296 A1* | 3/2003 | Doss et al. ................. | 707/102 |
| 2003/0052915 A1 | 3/2003 | Brown et al. | |
| 2003/0154293 A1 | 8/2003 | Zmolek | |
| 2004/0003042 A1* | 1/2004 | Horvitz et al. ............... | 709/204 |
| 2004/0117443 A1 | 6/2004 | Barsness | |
| 2004/0162882 A1* | 8/2004 | Mora .......................... | 709/207 |
| 2005/0084082 A1* | 4/2005 | Horvitz et al. ........... | 379/114.06 |
| 2005/0086211 A1 | 4/2005 | Mayer | |
| 2005/0289180 A1* | 12/2005 | Pabla et al. ................ | 707/104.1 |
| 2006/0140361 A1* | 6/2006 | Heikes et al. .............. | 379/88.22 |

OTHER PUBLICATIONS

Tang et al., ConNexus to Awarenex: Extending awareness to mobile users, Mar. 2001, retrieved from http://www.cc.gatech.edu/classes/AY2008/cs6452_fall/readings/connexus.pdf, pp. 1-8.*

* cited by examiner

*Primary Examiner* — Chau Le
(74) *Attorney, Agent, or Firm* — Steven M. Greenberg, Esq.; CRGO Law

(57) ABSTRACT

Embodiments of the present invention address deficiencies of the art in respect to instant messaging and provide a novel and non-obvious method, system and computer program product for probabilistic prediction of availability in an instant messaging system. In one embodiment of the invention, a probabilistic prediction method for instant messaging can be provided. The method can include collecting statistics for when different collaborators in an instant messaging system become available and unavailable. Thereafter, a particular one of the different collaborators can be selected and a probabilistic likelihood can be computed that the particular one of the collaborators will become available by a specified time. Finally, the computed probabilistic likelihood can be rendered in association with the particular one of the different collaborators.

17 Claims, 2 Drawing Sheets

PREDICTING AVAILABILITY OF INSTANT MESSAGING USERS

BACKGROUND OF THE INVENTION

1. Field of the Invention

The present invention relates to the field of instant messaging and more particularly to presence awareness for instant message users in an instant messaging system.

2. Description of the Related Art

Real time communications systems provide a substantial enhancement over more traditional, asynchronous communications systems. Electronic mail delivery systems, the prototypical asynchronous communications systems, in its time represented a giant leap forward in respect to global interpersonal communications. Prior to electronic mail, individuals primarily communicated via telephone, facsimile and post. With electronic mail, however, individuals expect near instant delivery of text, and even imagery, audio and video, without incurring the delay typical of the postal system, or the expense associated with telephony and fax technologies.

Despite the ubiquity of electronic mail, asynchronous communications systems lack several elements common in the realm of real time communications systems. In particular, the seemingly instant delivery of a message cannot be experienced in the world of electronic mail. In a real-time society, the minor latencies associated with electronic mail often cannot be suitable for the task at hand where a real-time conversation will be required in addressing a problem or performing a collaborative task. More importantly, often the feel and nature of a "conversation" as it is known to human beings only can be approximated through real time communications where the participants to a conversation feel the spontaneity of an exchange of ideas, much as is the case in a live, face-to-face conversation.

The recent rapid development of the Internet has led to advanced modes of synchronous, real-time collaboration able to fulfill the real-time communicative requirements of the modern computing participant. Using the Internet as a backbone, individuals worldwide can converge in real-time in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. These technologies include several human-to-human collaborative environments including instant messaging.

Conventional instant messaging systems allow users to exchange instant messages across a network. Instant messages generally are exchanged when individuals are online, though instant messages can be queued for individuals off-line or not proximate to the instant messaging client. To that end, instant messaging systems introduce semantics like online, away from desk, offline so that users are aware of each other's awareness status. Utilizing presence awareness, a collaborator can choose to send an instant message to an individual known to be online and expect the individual to receive the message instantaneously. By comparison, a collaborator can expect to send an instant message to an individual known to be away from their desk and expect the individual to receive the instant message upon returning.

In instances where a target user is known to be offline, a collaborator can choose to be alerted when the target user becomes online and available. The alert can include a notification sent to the collaborator. Upon receiving the alert, the collaborator can forward the instant message to the target user. While the alert feature has proven valuable to some, the value can be limited in that a target user may not come available for an extended period of time. In this circumstance, awaiting an alert can become an exercise in futility and an e-mail message can become a more appropriate mode of communications with the target user.

BRIEF SUMMARY OF THE INVENTION

Embodiments of the present invention address deficiencies of the art in respect to instant messaging and provide a novel and non-obvious method, system and computer program product for probabilistic prediction of availability in an instant messaging system. In one embodiment of the invention, a probabilistic prediction method for instant messaging can be provided. The method can include collecting statistics for when different collaborators in an instant messaging system become available and unavailable. Thereafter, a particular collaborator can be selected and a probabilistic likelihood can be computed that the particular collaborator will become available by a specified time. Finally, the computed probabilistic likelihood can be rendered in association with the particular collaborator.

In another embodiment of the invention, an instant messaging data processing system can be provided. The system can include an instant messaging server configured for communicative coupling to instant messaging clients over a computer communications network. The system also can include a data store of instant messaging statistics indicating when different collaborators in the instant messaging system become available and unavailable. Finally, the system can include probabilistic prediction logic coupled to each of the instant messaging server and the data store. The logic can include program code enabled to select a particular one of the different collaborators, to compute a probabilistic likelihood that the particular one of the collaborators will become available by a specified time, and to render in a probabilistic pop-up the computed probabilistic likelihood in association with the particular one of the different collaborators.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for probabilistic prediction of availability in an instant messaging system. In accordance with an embodiment of the present invention, statistical data can be tracked for collaborators in an instant messaging system. The statistical data can include when an associated collaborator becomes unavailable and when an associated collaborator becomes available and the duration of periods of unavailability. Consequently, it can be determined when a selected collaborator probabilistically will become available or unavailable which determination can be presented to inquiring collaborators in the instant messaging system.

Figure 1:
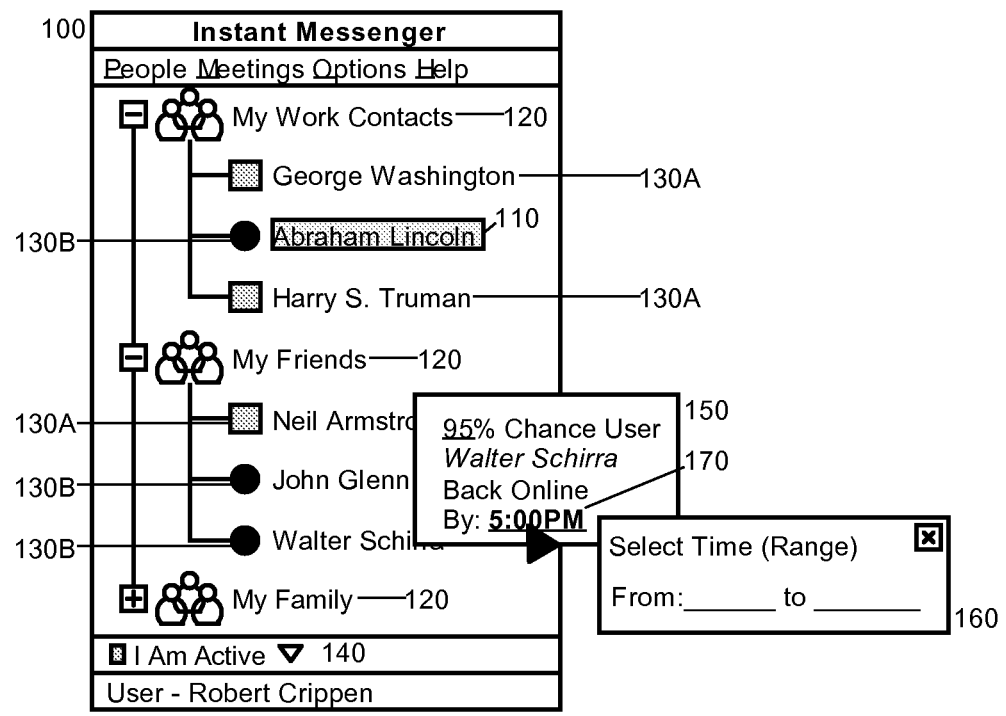
FIG. 1 is a pictorial illustration of an instant messenger configured for probabilistic prediction of availability for a target user.

In further illustration, FIG. 1 is a pictorial illustration of an instant messenger configured for probabilistic prediction of availability for a target user in an instant messaging system The instant messenger 100 can include a hierarchical view of buddies 130A, 130B arranged in user-specified groupings 120. Presence awareness can be applied to each of the buddies 130A, 130B so that available buddies 130A can be visually distinguished from unavailable buddies 130B. Additionally, a presence awareness control 140 can be included in the instant messenger 100 so that an end user can indicate a current state of availability for inquiring collaborators in the instant messaging system.

Notably, availability statistics can be tracked in the instant messaging system so that probabilistically it can be determined when a selected one of the buddies 130A, 130B is likely to change instant messaging state for example by becoming available or unavailable, or entering a do-not-disturb state, each according to the historical behavior of the selected one of the buddies 130A, 130B. As an example, whenever an unavailable buddy 130B is likely to become available or otherwise change instant messaging state in the near term, a highlight decorator 110 can be applied to the unavailable buddy 130B. Otherwise, initiating a proximity event for a selected one of the unavailable buddies 130B, for instance a mouse-over event or a mouse selection event, can result in the rendering of a probabilistic pop-up 150 providing a view to probabilistic information for the selected one of the unavailable buddies 130B.

The probabilistic information can relate to the likelihood that the selected one of the buddies 130A, 130B will change instant messaging state at a specified time 170, for example a becoming available state, a becoming unavailable state, and a do-not-disturb state, to name only a few possible states. Additionally, the probabilistic information can relate to the likelihood that an entire grouping of buddies 130A, 130B will change instant messaging state by a specified time 170. The specified time control 170 can be rendered activatable, however, such that the end user can provide a different time, or a range of times in time entry pop-up 160. Once a different time or range of times has been specified in the time entry pop-up 160, probabilistic information can be generated for the selected one of the unavailable buddies 130B for the different time or range of times to indicate a likelihood that the selected one of the unavailable buddies 130B will become available at the different time or range of times.

Figure 2:
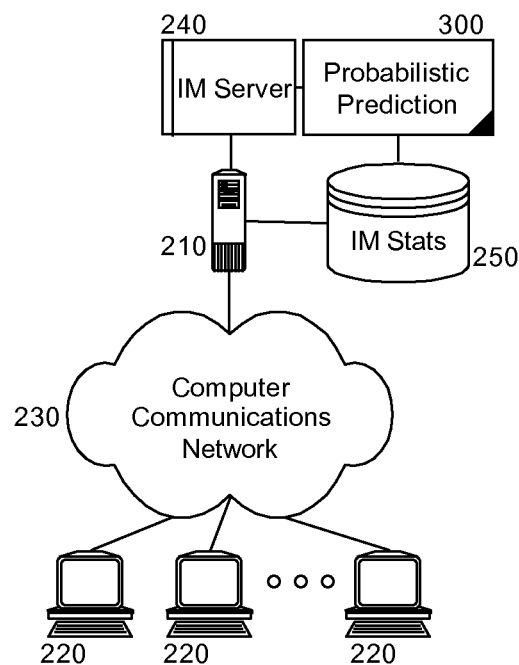
FIG. 2 is a schematic illustration of an instant messaging system configured for probabilistic prediction of availability of a target user; and, FIG. 3 is a flow chart illustrating a process for probabilistic prediction of availability in an instant messaging system.

The instant messenger 100 can be provided in an instant messaging system. In illustration, FIG. 2 depicts an instant messaging system configured for probabilistic prediction of availability of a target user. The system can include a host computing platform 210 configured for communicative coupling over a computer communications network 230 to one or more collaborative clients 220 each supporting the operation of an instant messaging client. The host computing platform 210 can host the execution of an instant messaging server 240 configured for managing instant messaging amongst the collaborative clients 220 over the computer communications network 230.

Importantly, probabilistic prediction logic 300 can be coupled to the instant messaging server 240. The probabilistic prediction logic 300 can include program code enabled to track and store presence awareness data in a data store of instant messaging statistics 250. The presence awareness data can include by way of example when an instant messaging user becomes unavailable and when an instant messaging user becomes available and for how long an instant messaging user remains unavailable. The program code of the probabilistic prediction logic 300 further can be enabled to provide a probabilistic predication for when a selected instant messaging user will become available. Finally, the program code of the probabilistic prediction logic 300 yet further can be enabled to compute a probability that a selected instant messaging user will become available by a selected time or during a range of times.

Figure 3:
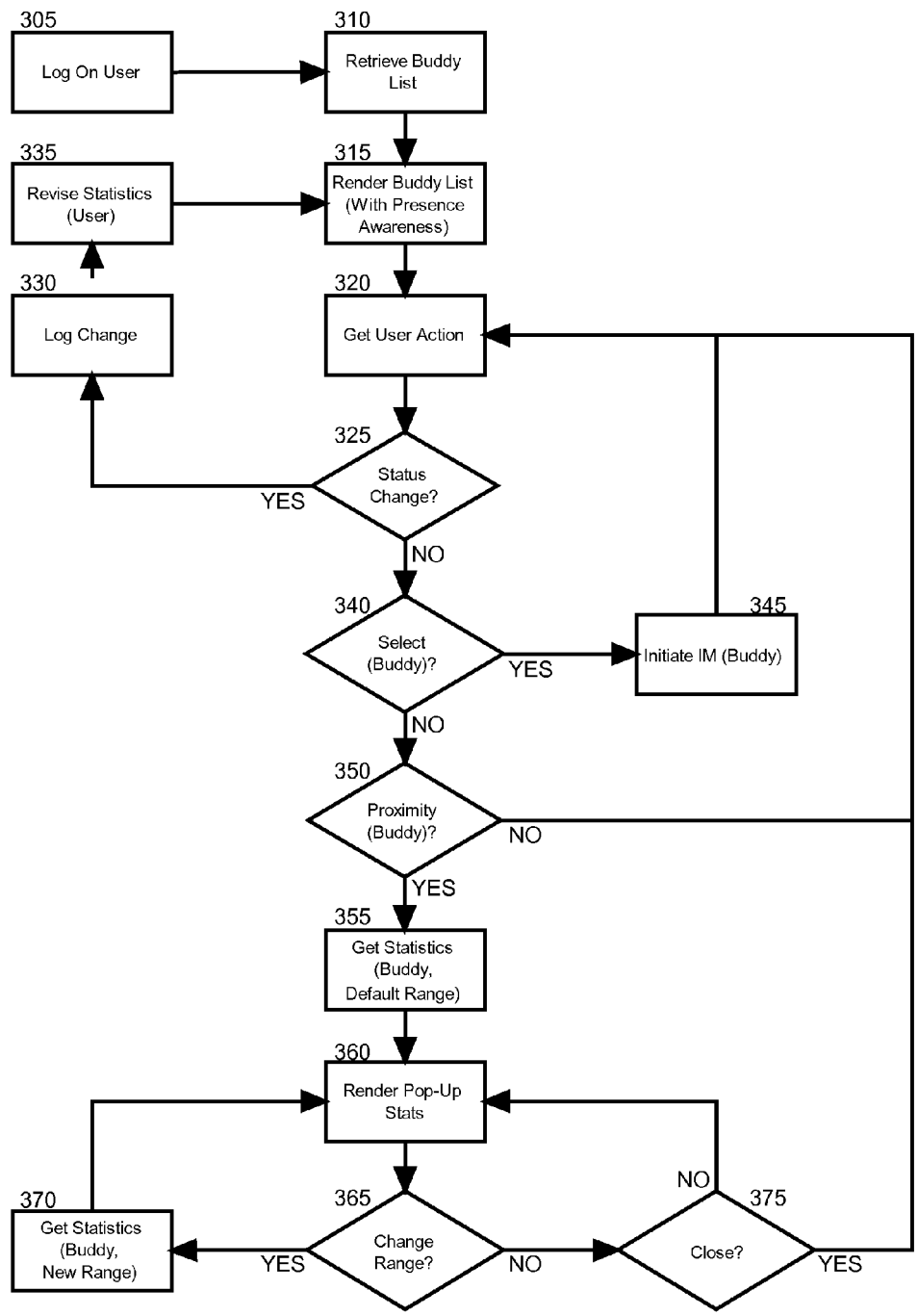

In yet further of the operation of the probabilistic prediction logic 300, FIG. 3 shows a process for probabilistic prediction of availability in an instant messaging system. Beginning in block 305, an instant messaging end user can log into an instant messaging system and in block 310, a buddy list for the end user can be retrieved. In block 315, the buddy list can be rendered in the instant messenger for the end user and the end user can be free to interact with the instant messenger in block 320. In decision block 325, if the end user applies a status change for presence awareness from available to unavailable (or vice versa), in block 330 the change can be logged and the presence awareness statistics for the end user can be revised in block 335.

In decision block 340, if the end user selects a particular one of the buddies in the buddy list, in block 345 an instant messaging session can be initiated with the selected buddy in block 340 and the process can return to block 320. However, if the end user merely performs a mouse over in proximity to the a particular one of the buddies in the buddy list in decision block 350, in block 355 the presence awareness statistics for the buddy can be retrieved in association with a default time of availability. Thereafter, in block 360 the presence awareness statistics for the buddy can be displayed in a pop-up near the buddy in the instant messenger. In decision block 365, if the end user chooses a different time or range of times, in block 370 different statistics can be retrieved for the chosen time or range of times and the pop-up can be redisplayed with the different statistics. Finally, in decision block 375, if the end user chooses to close the pop-up, the process can return to block 320.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A probabilistic prediction method for instant messaging, the method comprising:
   collecting statistics for when different collaborators in an instant messaging system become available and unavailable;
   selecting a particular one of the different collaborators;
   computing a probabilistic likelihood that the particular one of the collaborators will become available by a specified time; and,
   rendering in a probabilistic pop up within at least part of an instant messaging window of the instant messaging system, the computed probabilistic likelihood and also the specified time that the particular one of the different collaborators will become available, the probabilistic pop up configured to be a portion of a size of the instant messaging window and also rendered in response to the detection of a proximity event for the selected particular one of the different collaborators, the specified time being an activatable specified time control being adjustable by a collaborator different from the particular one of the different collaborators, the specified time consisting of one of a time of day and a range of time in a day.

2. The method of claim 1, further comprising:
   specifying a different time of availability;
   re-computing a probabilistic likelihood that the particular one of the collaborators will become available by the different time; and,
   rendering in a different probabilistic pop up within at least part of the instant messaging window of the instant messaging system the re-computed probabilistic likelihood in association with the particular one of the different collaborators, the different probabilistic pop up configured to be a portion of a size of the instant messaging window and also rendered in response to the detection of a proximity event for the selected particular one of the different collaborators.

3. The method of claim 1, further comprising:
   specifying the range of time during which the particular one of the collaborators is to become available;
   re-computing a probabilistic likelihood that the particular one of the collaborators will become available during the specified range time; and,
   rendering in a different probabilistic pop up within at least part of the instant messaging window of the instant messaging system the re-computed probabilistic likelihood in association with the particular one of the different collaborators, the different probabilistic pop up configured to be a portion of a size of the instant messaging window and also rendered in response to the detection of a proximity event for the selected particular one of the different collaborators.

4. The method of claim 1, further comprising revising the statistics whenever any of the different collaborators transition from available to unavailable and from unavailable to available.

5. The method of claim 1, wherein selecting the particular one of the different collaborators, comprises performing a mouse over proximate to the particular one of the different collaborators.

6. The method of claim 1, wherein selecting the particular one of the different collaborators, comprises performing a mouse selection of the particular one of the different collaborators.

7. The method of claim 1, further comprising:
   detecting a high likelihood that at least one of the different collaborators shortly will change instant messaging state from one of unavailable to available and available to unavailable; and,
   applying a highlight visual characteristic to a display of the at least one of the different collaborators in the instant messaging window of the instant message system in response to detecting the high likelihood that at least one of the different collaborators shortly will change instant messaging state from one of unavailable to available and available to unavailable.

8. An instant messaging data processing system, comprising:
   an instant messaging server with at least one processor and memory and configured for communicative coupling to a plurality of instant messaging clients over a computer communications network;
   a data store of instant messaging statistics indicating when different collaborators in an instant messaging system become available and unavailable; and,
   probabilistic prediction logic coupled to each of the instant messaging server and the data store, the logic comprising program code enabled when executing in the memory by the at least one processor to select a particular one of the different collaborators, to compute a probabilistic likelihood that the particular one of the collaborators will become available by a specified time, and to render in a probabilistic pop-up within at least part of an instant messaging window of the instant messaging system, the computed probabilistic likelihood and also the specified time that the particular one of the different collaborators will become available, the probabilistic pop up configured to be a portion of a size of the instant messaging window and also rendered in response to the detection of a proximity event for the selected particular one of the different collaborators, the specified time being an activatable specified time control being adjustable by a collaborator different from the particular one of the different collaborators, the specified time consisting of one of a time of day and a range of time in a day.

9. The system of claim 8, wherein the specified time configured to be activatable is a specified time control displaying one of the time of day and the range of time in the day, the activatable specified time control causing a rendering of a time entry pop-up responsive to activation.

10. The system of claim 8, wherein the program code of the probabilistic prediction logic further is enabled to detect a high likelihood that at least one of the different collaborators shortly will become available, and to apply a highlight visual characteristic to a display of the at least one of the different collaborators in response to detecting the high likelihood that at least one of the different collaborators shortly will become available.

11. A computer program product comprising a computer usable memory embodying computer usable program code for probabilistic prediction for instant messaging, the computer program product comprising:

computer usable program code for collecting statistics for when different collaborators in an instant messaging system become available and unavailable;

computer usable program code for selecting a particular one of the different collaborators;

computer usable program code for computing a probabilistic likelihood that the particular one of the collaborators will become available by a specified time; and, computer usable program code for rendering in a probabilistic pop up within at least part of an instant messaging window of the instant messaging system, the computed probabilistic likelihood and also the specified time that the particular one of the different collaborators will become available, the probabilistic pop up configured to be a portion of a size of the instant messaging window and also rendered in response to the detection of a proximity event for the selected particular one of the different collaborators, the specified time being an activatable specified time control being adjustable by a collaborator different from the particular one of the different collaborators, the specified time consisting of one of a time of day and a range of time in a day.

12. The computer program product of claim 11, further comprising:

computer usable program code for specifying a different time of availability;

computer usable program code for re-computing a probabilistic likelihood that the particular one of the collaborators will become available by the different time; and, computer usable program code for renderizng in a different probabilistic pop up within at least part of the instant messaging window of the instant messaging system the re-computed probabilistic likelihood in association with the particular one of the different collaborators, the different probabilistic pop up configured to be a portion of a size of the instant messaging window and also rendered in response to the detection of a proximity event for the selected particular one of the different collaborators.

13. The computer program product of claim 11, further comprising:

computer usable program code for specifying the range of time during which the particular one of the collaborators is to become available;

computer usable program code for re-computing a probabilistic likelihood that the particular one of the collaborators will become available during the specified range time; and, computer usable program code for rendering in a different probabilistic pop up within at least part of the instant messaging window of the instant messaging system the re-computed probabilistic likelihood in association with the particular one of the different collaborators, the different probabilistic pop up configured to be a portion of a size of the instant messaging window and also rendered in response to the detection of a proximity event for the selected particular one of the different collaborators.

14. The computer program product of claim 11, further comprising computer usable program code for revising the statistics whenever any of the different collaborators transition from available to unavailable and from unavailable to available.

15. The computer program product of claim 11, wherein the computer usable program code for selecting the particular one of the different collaborators, comprises computer usable program code for performing a mouse over proximate to the particular one of the different collaborators.

16. The computer program product of claim 11, wherein the computer usable program code for selecting the particular one of the different collaborators, comprises computer usable program code for performing a mouse selection of the particular one of the different collaborators.

17. The computer program product of claim 11, further comprising:

computer usable program code for detecting a high likelihood that at least one of the different collaborators shortly will change instant messaging state from one of unavailable to available and available to unavailable; and, computer usable program code for applying a highlight visual characteristic to a display of the at least one of the different collaborators in the instant messaging window of the instant message system in response to detecting the high likelihood that at least one of the different collaborators shortly will change instant messaging state from one of unavailable to available and available to unavailable.

\* \* \* \* \*